United States Patent
Ruokolainen et al.

(10) Patent No.: US 7,498,543 B2
(45) Date of Patent: Mar. 3, 2009

(54) METHOD FOR JOINING OR REPAIRING METAL SURFACE PARTS

(75) Inventors: Robert B. Ruokolainen, Livonia, MI (US); Michael D. Hanna, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 197 days.

(21) Appl. No.: 11/386,202

(22) Filed: Mar. 22, 2006

(65) Prior Publication Data

US 2007/0221631 A1    Sep. 27, 2007

(51) Int. Cl.
B23K 9/00    (2006.01)

(52) U.S. Cl. .................. 219/137 R; 219/137 WM; 219/146.22; 228/119; 228/120

(58) Field of Classification Search .......... 156/60, 156/150, 151, 230, 233, 297, 299; 219/121.11, 219/130.51, 137 WM, 137.71, 146.1, 148, 219/137 R, 146.22; 228/119, 120
See application file for complete search history.

(56) References Cited

U.S. PATENT DOCUMENTS

| | | | | |
|---|---|---|---|---|
| 3,567,436 | A | * | 3/1971 | Isobe et al. ............... 420/516 |
| 4,313,996 | A | | 2/1982 | Newman et al. |
| 4,601,941 | A | * | 7/1986 | Lutz et al. ................. 428/213 |
| 4,990,310 | A | | 2/1991 | Rashid |
| 5,030,488 | A | | 7/1991 | Sobolev |
| 5,429,326 | A | * | 7/1995 | Garesche et al. ........... 244/133 |
| 5,509,728 | A | * | 4/1996 | Hanna et al. ............. 303/115.2 |
| 5,813,592 | A | * | 9/1998 | Midling et al. ........... 228/112.1 |
| 6,148,515 | A | * | 11/2000 | Suzuki et al. ............. 29/888.06 |
| 6,398,286 | B1 | | 6/2002 | Devin et al. |
| 7,176,410 | B2 | * | 2/2007 | Fortain et al. .......... 219/137 PS |
| 2001/0035266 | A1 | * | 11/2001 | Kennedy ................. 156/331.4 |
| 2004/0151921 | A1 | * | 8/2004 | Labordus et al. ............ 428/457 |

OTHER PUBLICATIONS

M. D. Hanna "The Influence of Compositiion and Microstructure on the Strength of Zinc Alloys" published paper dated 1994.
M. D. Hanna "ACuZinc 5 Applications in the Auto Industry" published paper dated 1996.
Jang-Kyo Kim Forming and Failure Behaviour of Coated, Laminate and Sandwiched Sheet Metals: a review Journal of Materials Processing Technology vol. 63 dated 1997.
M. D. Hanna "Sliding Wear and Friction Characteristics of Six ZN-based Die-Casting Alloys" Wear vol. 203-204 dated 1997.
Fronius International "CMT: Cold Metal Transfer" Published Advertisement.
Fronius International "The New Revolution in Digital GMA Welding".

* cited by examiner

*Primary Examiner*—Kiley Stoner
*Assistant Examiner*—Nicholas P D'Aniello

(57) ABSTRACT

A method of joining or repairing metal surface structures. Joinder and/or repair of metal or metal-polymer laminate panels may be carried out using so-called "cold metal transfer" gas metal arc welding techniques. Moreover, suitable zinc-copper-aluminum alloys may improve weldability, durability and strength. The reduced thermal input permits effective weld formation at the metal sheet layers without giving rise to temperature gradient sufficient to significantly damage the interior elements.

16 Claims, 5 Drawing Sheets

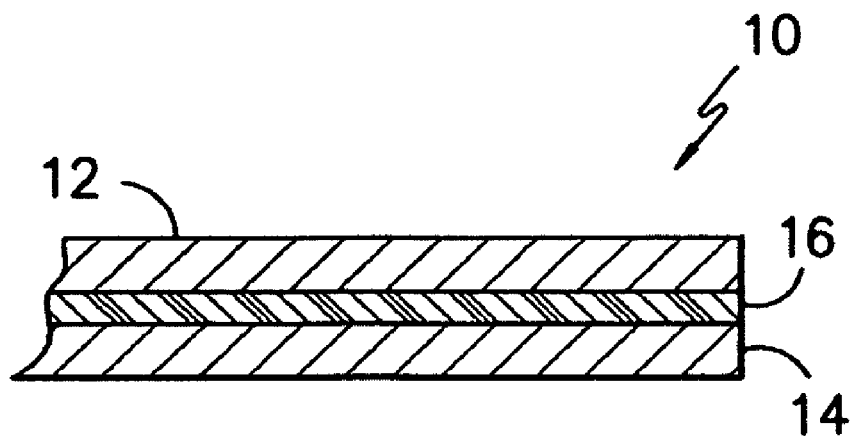
FIG. -1-
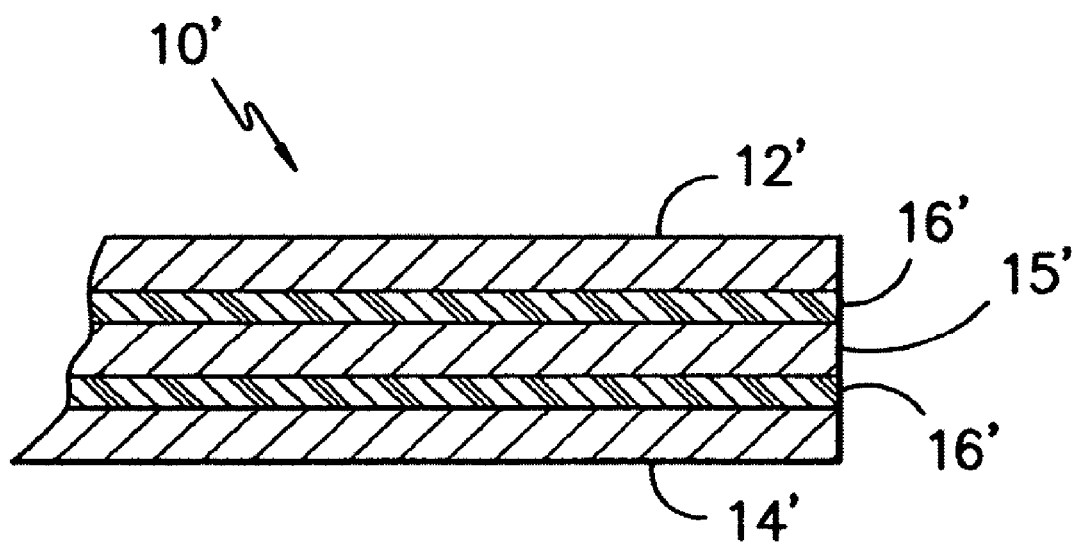
FIG. -1A-

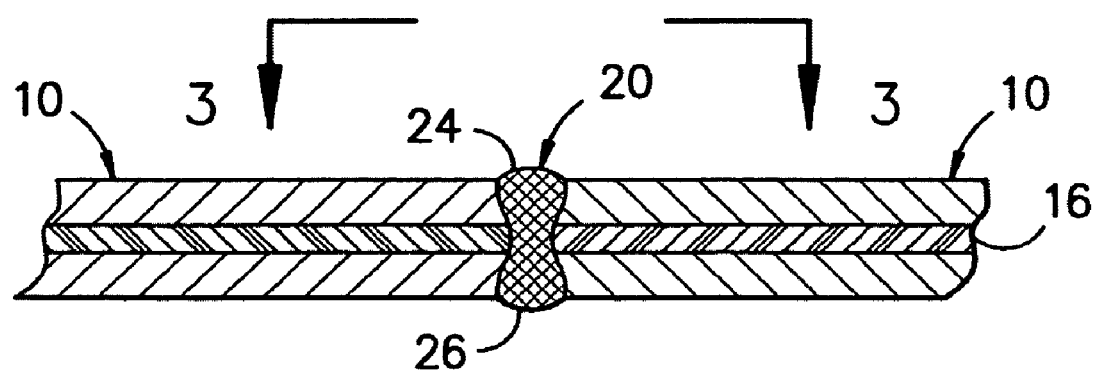
FIG. -2-
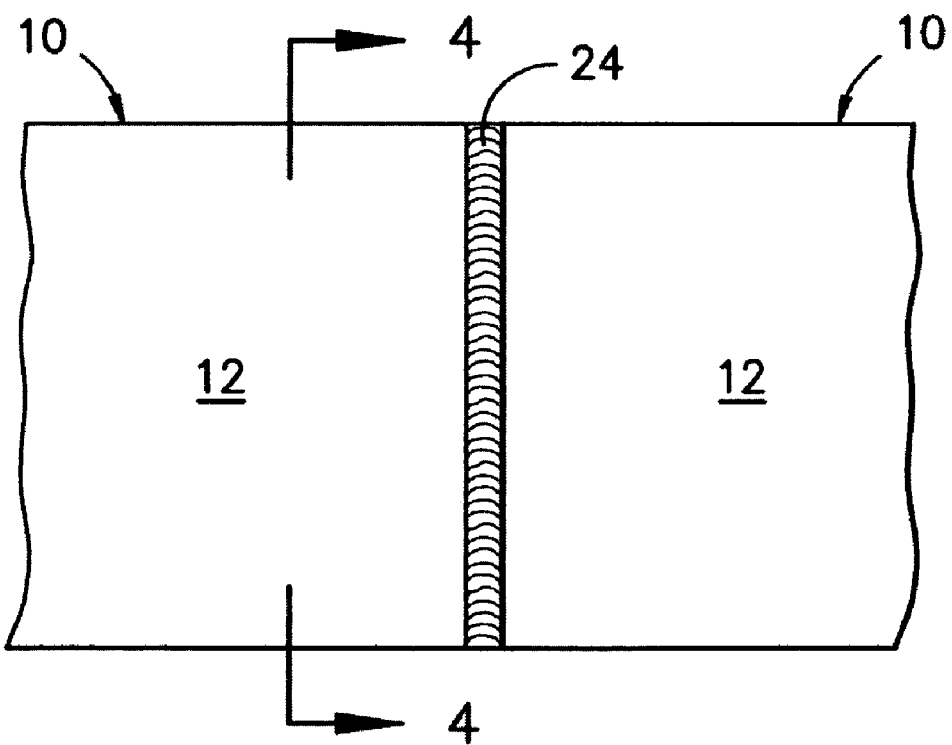
FIG. -3-

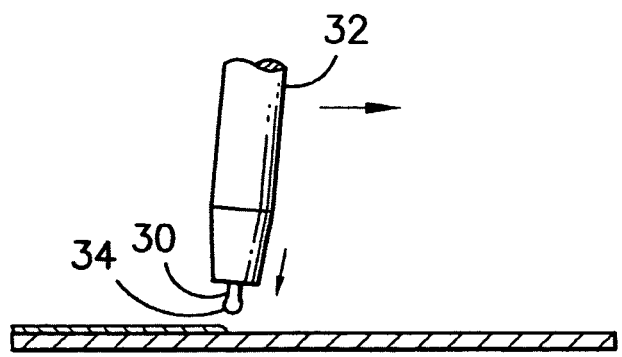
FIG. −4A−
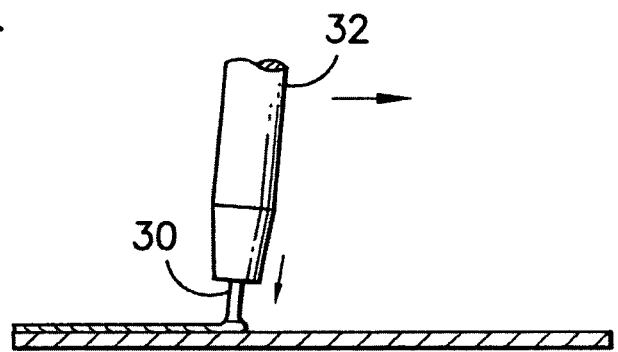
FIG. −4B−
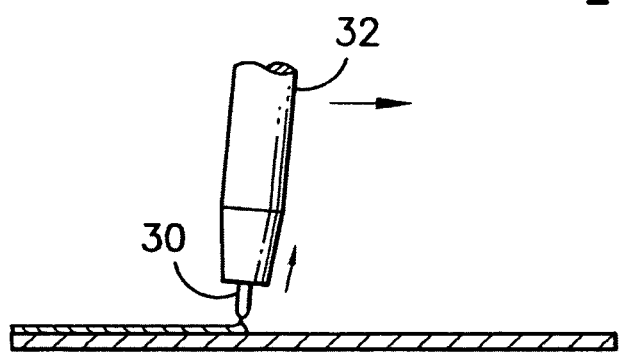
FIG. −4C−
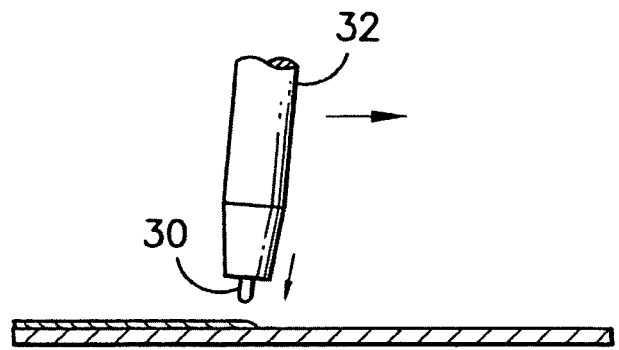
FIG. −4D−

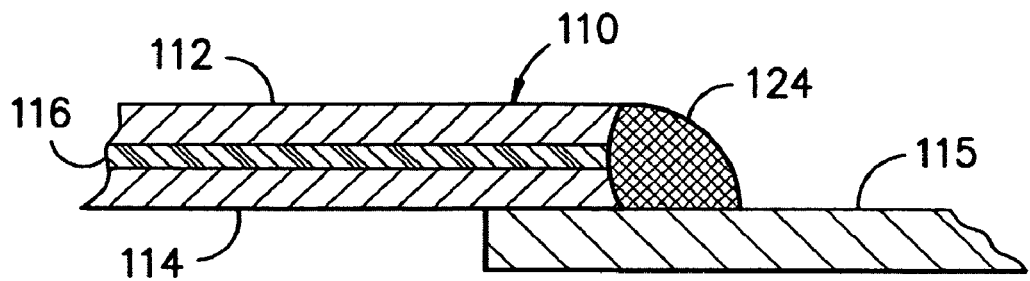
FIG. -5-
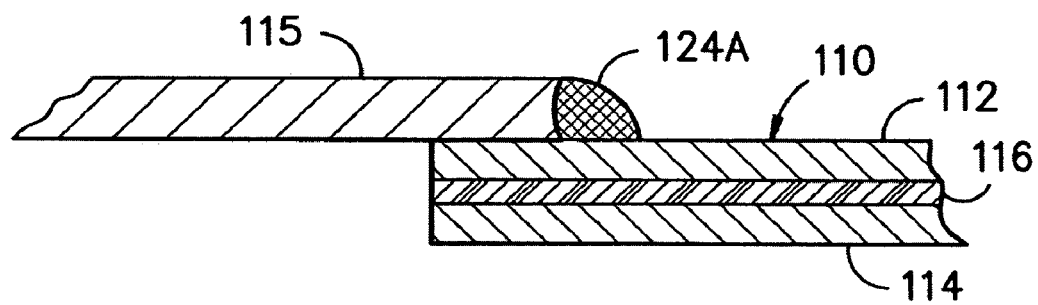
FIG. -5A-
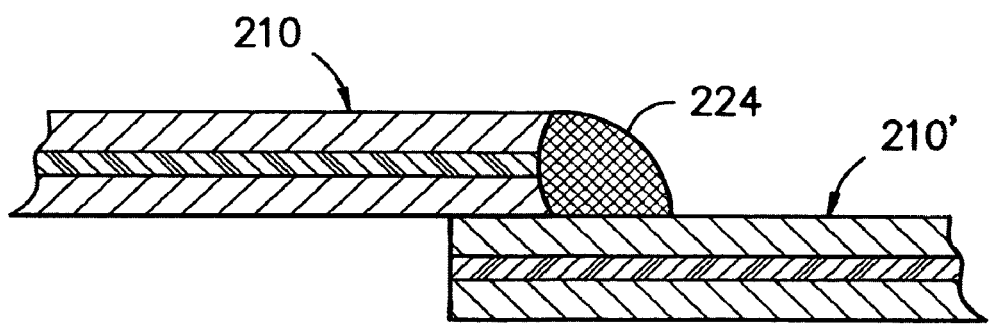
FIG. -6-

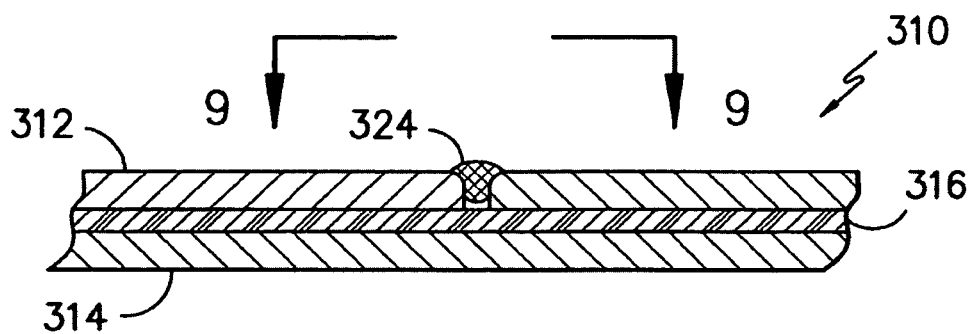
FIG. -7-
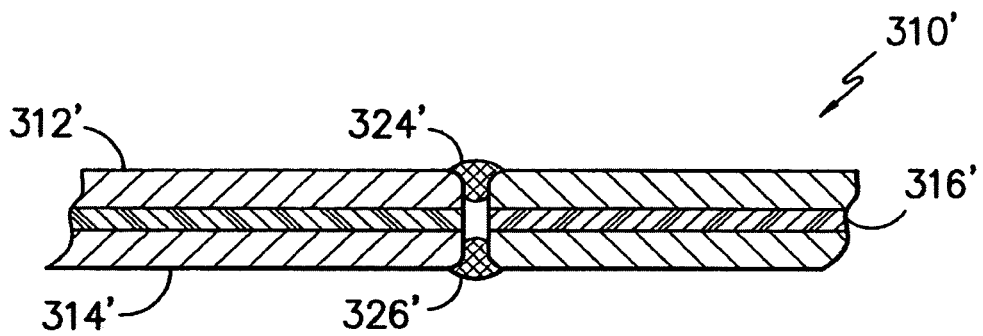
FIG. -8-
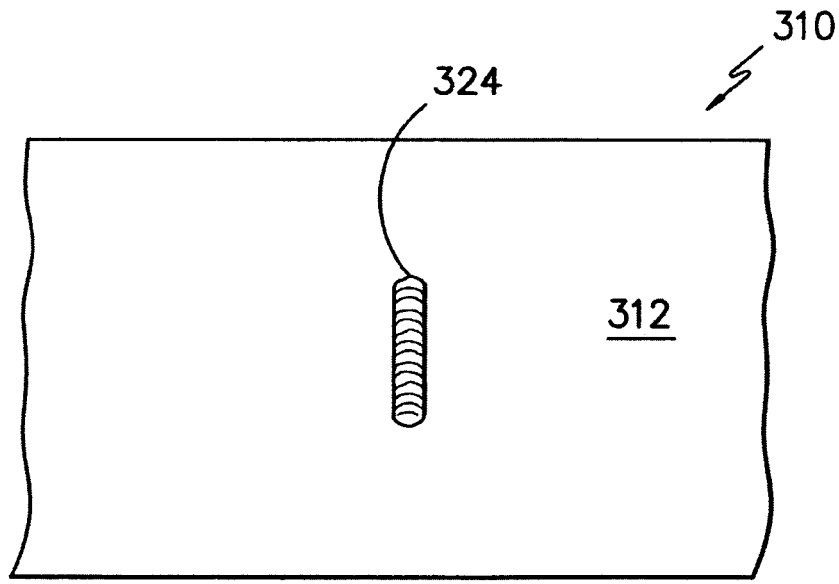
FIG. -9-

METHOD FOR JOINING OR REPAIRING METAL SURFACE PARTS

TECHNICAL FIELD

The present invention relates generally to the field of connecting and/or repairing metal surface structures. More particularly, the invention relates to welding practices utilizing low levels of heat input and to methods of joining or repairing metal laminate structures having a metal skin overlying one or more layers of polymeric material. Materials useful in carrying out such connection and repair are also provided.

BACKGROUND OF THE INVENTION

Metal laminate structures are well known. Such structures typically have outer metal sheets of steel or other structural metal with one or more layers of polymer and/or metal disposed between the outer metal sheets. Such structures provide strength benefits due to the outer metal layers while having the benefit of reduced weight and sound absorption due to the polymeric interior.

Several different types of metal laminate structures are known. One such known structure is made up of metal sheets of similar or dissimilar composition with a low density polymeric core between the metal sheets. In such constructions the core thickness is normally about 40% to about 60% of the total laminate thickness. Another construction utilizes metal sheets of similar or dissimilar composition with a thin viscoelastic polymeric adhesive layer between the metal sheets. In such constructions, the core thickness is normally less than about 20% of the total laminate thickness. It is also known to use outer metal sheets of similar or dissimilar composition with one or more interior metal sheets with thin polymeric epoxy adhesive layers interposed between opposing metal sheets. In such constructions, the polymeric layers normally make up less than about 20% of the total laminate thickness.

Laminated steels have been used in the manufacture of automotive vehicles in various structural panel members. Specifically, laminated steel panels have been spot welded into vehicles during assembly. However, the use of laminated steel panels has been limited due to the inability to efficiently join panels of such material to one another or to solid steel with continuous weld joints. In this regard it has been found that traditional gas metal arc welding as would normally be used in joining steel panels together is generally unsuitable for laminated steel structures due to heat degradation of the polymeric core layer at significant distances outboard of the weld. Likewise, such traditional techniques are also generally unsuitable for carrying out surface repairs of laminated steel panels. As will be appreciated, the need for such repairs may arise as a result of damage during initial stamping operations and/or in post production repair as a result of automotive collisions.

SUMMARY OF THE INVENTION

The present invention provides advantages and/or alternatives over the prior art by providing a method of joining metal surface structures including metal-polymer structural laminates to one another along a substantially continuous welded interface. The method of the present invention also permits the repair of splits and cracks across the surface of a metal surface structure. Such techniques may substantially facilitate the enhanced use of metal-polymer structural laminates in the automotive industry and other environments of use such as aircraft manufacture and maintenance, building construction and the like where panel joinder and repair is desirable.

According to a potentially preferred aspect of the invention, it is contemplated that joinder and/or repair of steel or other metal laminate panels may be carried out using so-called "cold metal transfer" gas metal arc welding techniques. As will be described further hereinafter, such techniques utilize a controlled wire motion wherein the weld wire is moved relative to the weld pool in conjunction with controlled arc activation and extinguishment such that thermal input to the work piece is minimized. The reduced thermal input permits effective weld formation at the metal sheet layers without giving rise to temperature gradient sufficient to significantly damage the interior polymeric core layer at positions substantially outboard of the weld line.

According to one potentially preferred feature, it is contemplated that cold metal transfer techniques may be carried out on laminates and other metal surface structures using a zinc-copper-aluminum alloy filler.

BRIEF DESCRIPTION OF THE DRAWINGS

The following drawings which are incorporated in and which constitute a part of this specification illustrate exemplary practices in accordance with the present invention and, together with the general description above and the detailed description set forth below, serve to explain the principals of the invention wherein:

FIGS. 1 and 1A illustrate exemplary metal-polymer laminate structures;

FIG. 2 illustrates a pair of laminate structures as illustrated in FIG. 1 joined in welded relation along a connective interface;

FIG. 3 is an elevation view taken generally along line 3-3 in FIG. 2 showing a connective weld line;

FIGS. 4A-4D are views taken generally along line 4-4 in FIG. 3 showing the progressive formation of the connective weld using a cold metal transfer technique;

FIGS. 5 and 5A illustrate laminate to solid lap weld structures;

FIG. 6 illustrates a laminate to laminate lap weld structure;

FIG. 7 is a cross-sectional view illustrating a surface repair joint across one surface of a metal-polymer laminate structure;

FIG. 8 is a view similar to FIG. 7 illustrating a pair of cooperating surface repair joints across opposing surfaces of a metal-polymer laminate structure; and FIG. 9 is a plan view taken generally along line 9-9 in FIG. 7 illustrating a discrete length surface repair joint.

While embodiments of the invention have been illustrated and generally described above and will hereinafter be described in connection with certain potentially preferred procedures and practices, it is to be understood and appreciated that in no event is the invention to be limited to such embodiments and procedures as may be illustrated and described herein. On the contrary, it is intended that the present invention shall extend to all alternatives and modifications as may embrace the broad principals of the invention within the true spirit and scope thereof.

DESCRIPTION OF PREFERRED EMBODIMENTS

Reference will now be made to the various drawings wherein to the extent possible, like elements are designated by corresponding reference numerals in the various views. In FIG. 1, a laminate construction 10 is illustrated. The laminate construction 10 has a first surface layer 12 and a second opposing surface layer 14 with an intermediate polymeric layer 16 disposed between the two surface layers. The surface layers 12, 14 are preferably formed from a structural steel alloy or the like having a thickness in the range of about 0.45 to about 0.55 mm although greater or lesser thickness may be used if desired. Zinc coated steel may be particularly preferred. It is also contemplated that other ferrous or non-ferrous metals may be used including aluminum, high alloy stainless steels and the like. The surface layers may be either similar or dissimilar in composition.

The polymeric layer 16 may be formed of any polymeric resinous material suitable for lamination to the surface layers 12, 14 and with strength and glass transition temperature characteristics suitable to function under normal operating conditions. By way of example only, and not limitation, exemplary polymers may include ethylene polymers and co-polymers and propylene polymers and co-polymers. Such materials include polypropylene, low density or high density polyethylene, ethylene/vinyl acetate co-polymer, ethylene/acrylic co-polymer, and ethylene/butene-1 and other alkene-1 co-polymers. Visco-elastic resins and aramid epoxy resins may be particularly preferred. The polymeric resin material can be bonded directly to the surface layers 12, 14 or can be held in place by an intermediate adhesive layer. The thickness of the polymeric layer 16 is preferably in the range of about 0.025 to about 0.040 mm although greater or lesser thickness may be used if desired.

In an alternative construction 10' illustrated in FIG. 1A, one or more intermediate structural layers 15' of metal or other material is disposed at an intermediate position between the surface layers 12', 14' with polymeric layers 16' of similar or dissimilar composition interposed between the opposing structural layers. Of course, any number of intermediate structural layers may be used as desired FIG. 2 illustrates the joinder of a pair of laminate constructions 10 as shown in FIG. 1 along a connective interface 20. Of course, it is to be understood that constructions with intermediate structural layers such as illustrated in FIG. 1A may likewise be joined together. Combinations of the various constructions may also be joined if desired.

In the exemplary attachment shown in FIG. 2, the connective interface 20 preferably includes a pair of substantially continuous weld connections 24, 26 running along a weld line at the interface between the laminate constructions 10. As shown, the weld connections 24, 26 preferably extend at least partially across the thickness of the surface layers 12, 14 so as to effect a secure connection between the adjoined laminate structures. A portion of the weld connections may also extend partially into the polymeric layer 16 and quite possibly across the polymeric layer 16 connecting layers 12 to 14. However, it is also contemplated that at least a portion of the interface between the polymeric layers may remain substantially unaffected by the connecting welds such that at least a portion of the interface between the adjacent polymeric layers remains unmelted during the welding procedure. Portions of the polymeric layers outboard of the weld line preferably remain substantially unmelted.

As best illustrated in FIG. 3, the weld connections 24, 26 are preferably substantially continuous along their length. This may be distinguished from so-called spot welding wherein localized junctures are established along a connection line with zones of space between those junctures.

In order to achieve a substantially continuous weld connection while avoiding undesired degradation of the polymeric layer 16 outboard of the weld line, a cold metal transfer gas metal arc welding procedure is utilized. As will be appreciated by those of skill in the art, the cold metal transfer process is based on a deliberate and systematic activation and deactivation of the heating arc so as to systematically heat and cool the weld wire while bringing the wire into and out of contact with the weld pool at a rapid frequency. By way of example only and not limitation, a system that is believed to be suitable for such cold metal transfer is believed to be available from Fronius International having a place of business in Wels, Austria.

By way of example, the formation of a weld connection using cold metal transfer techniques is illustrated in FIGS. 4A-4D. As shown in FIG. 4A, during an arcing period, the weld wire 30 carried by the weld head 32 is moved forward towards the weld pool. As can be seen, during this extension, the heat application by the arc causes a drop 34 to form at the distal end of the weld wire. When the weld wire 30 engages the weld pool (FIG. 4B), the arc is extinguished and the wire is retracted (FIG. 4C) thereby causing detachment of the droplet along the weld line. Thereafter, the process is reversed (FIG. 4D) with reactivation of the arc and the foregoing steps are repeated. By carrying out the rapid insertion and withdrawal of the weld wire and synchronization with activation and termination of the arc, a high quality substantially continuous weld may be formed without the application of extreme heat levels.

It is also contemplated that the cold metal transfer procedure as outlined above may be used in the formation of lap joints in which a laminate composite as described is attached in overlapping relation to a non-laminated attachment element or to a second composite structure of similar or dissimilar construction as may be desired. By way of example only, FIGS. 5 and 5A illustrate lap joints formed between a laminate construction 110 and a substantially solid attachment element 115 such as a steel plate or the like. By way of example only, and not limitation, the laminate construction 110 may be in the form of a pair of zinc coated steel skin plates 112, 114 disposed in sandwiching relation to a viscoelastic core 116 and the attachment element 115 may be solid zinc coated steel. Of course, other materials as previously described and known to those of skill in the art may be used if desired.

As shown in FIG. 5, in one practice it is contemplated that the laminate construction 110 may be disposed in overlapping relation to the attachment element 115 such that a weld connection 124 formed using cold metal transfer techniques as illustrated and described in relation to FIGS. 4A-4D may be applied along an edge of the laminate construction 110 such that the filler material is disposed across the surface of the attachment element 115.

Another contemplated variation of a lap joint is illustrated in FIG. 5A. As will be appreciated, in this embodiment the attachment element 115 is disposed in overlapping relation to the laminate construction 110 such that a weld connection 124A formed using cold metal transfer techniques as illustrated and described in relation to FIGS. 4A-4D may be applied along an edge of the attachment element 115 such that the filler material is disposed across the surface of the laminate construction 110.

It is also contemplated that two laminate constructions of similar or dissimilar make-up may be attached by a lap joint. By way of example only, one such arrangement is illustrated in FIG. 6 wherein a pair of laminate constructions 210, 210' such as zinc coated steel skin layers sandwiching polymeric core layers are secured in overlapping welded relation using a weld connection 224 formed using cold metal transfer techniques as illustrated and described in relation to FIGS. 4A-4D.

As previously indicated, aside from the formation of connective welds, it is also contemplated that the cold metal transfer procedure as outlined above may find application in the repair of splits or tears across surfaces of a laminate composite as previously described. In such an application, the procedure would be substantially as described above although the distance of the weld line may be greatly reduced as defined by the crack or tear being repaired.

By way of example only, FIG. 7 illustrates a repair joint 324 formed by cold metal transfer procedures across a metal surface layer 312 of a laminate construction 310 so as to repair a crack or tear. As shown, it is contemplated that the repair joint 324 may be disposed substantially at the surface layer 312 without penetrating the polymeric layer 316 or an opposing surface layer 314. Alternatively, the repair joint 324 may extend partially or completely across the polymeric layer 316 if desired. As illustrated in FIG. 9, the repair joint 324 is of a finite length such that it is substantially surrounded by portions of the surface layer 312.

As best shown in FIG. 8, it is also contemplated that a complementary pair of repair joint 324', 326' may be formed by cold metal transfer procedures across metal surface layers 312', 314' of a laminate construction 310 so as to repair a crack or tear through both surface layers. As shown, it is contemplated that the repair joints 324', 326' may be disposed substantially at the surface layers 312', 314' without penetrating the polymeric layer 316'. Alternatively, the repair joints may extend partially or completely across the polymeric layer 316' if desired. While two repair joints 324', 326' have been illustrated, it is also contemplated that a single repair joint may be used if desired.

As previously indicated, it is contemplated that the use of a zinc based filler metal in the weld wire 30 may be desirable. While standard zinc alloy filler material may be suitable in a number of applications, it is contemplated that a zinc based ternary alloy composition of zinc, aluminum and copper may provide particular benefits in cold metal transfer operations. In particular, the use of such ternary alloys may provide increased strength, hardness, wear and creep resistance when used as filler materials in cold metal transfer joining operations as previously described. The use of such ternary compositions may provide benefits in the joining of both laminate structures as well as in the joining of standard sheet structures having outer metal surfaces when cold metal transfer techniques are utilized. That is, the benefits of such ternary filler metal compositions are not limited to constructions incorporating laminate structures.

By way of example only, and not limitation, a family of zinc-based ternary alloys that may be particularly useful as filler in cold metal transfer operations is recognized under the trade designation ACUZINC©. Various features of such ternary alloy systems are set forth in U.S. Pat. No. 4,990,310 which is incorporated herein by reference in its entirety.

Exemplary alloys of benefit include those recognized under the trade designations ACUZINC 10, ACUZINC 5, and ACUZINC-TF. As will be appreciated by those of skill in the art, ACUZINC 10 is made up of about 10 to 11 weight percent copper and about 3 to 4 weight percent aluminum with the remainder being zinc and impurities. ACUZINC 5 is made up of about 5 to 6 weight percent copper and about 4 weight percent aluminum, with the remainder being zinc and impurities. ACUZINC-TF is made up of about 3.5 to about 4.5 (preferably about 4.0) weight percent copper, and about 6.3 to about 8.0 (preferably about 7.6) weight percent aluminum with the remainder being zinc and impurities. Each of these alloys may optionally include up to about 0.05 weight percent (preferably 0.025 to about 0.05 percent) magnesium as a stress corrosion reducer.

Compositions such as ACUZINC-TF and ACUZINC 5 may be particularly preferred for use as fillers in cold metal transfer operations. These alloys have been found to be characterized by excellent fluidity which may be beneficial in the relatively low temperature cold metal transfer process. The resultant solidified structure is characterized by a high tensile strength relative to the melting point. If a stronger weld is desired, it is contemplated that an increased percentage of copper such as is used in the ACUZINC 5 and ACUZINC-10 composition may be beneficial. Although the increased percentage of copper causes the melting point to increase, it still provides a relatively high ratio of tensile strength to melting point. In this regard, each of the ternary ACUZINC compositions provides a ratio of tensile strength to melting point that is greater than such common filler metals as $CuSi_3$ and ZAMAK 3.

In cold metal transfer operations where heat input is to be minimized, it is contemplated that an alloy composition corresponding generally to the eutectic composition of the Al, Cu, Zn system may be particularly desirable. Specifically in a ternary alloy composition of about 4.0 weight percent copper, about 7.6 weight percent aluminum with the remainder Zinc and impurities, the system has a depressed melting point of about 378 degrees C. As will be appreciated, this is the eutectic temperature for the system. Accordingly, the melting point at this composition is significantly lower than other compositions or any of the individual components. At this eutectic composition the solidification reaction involves the phase transformation from liquid to a solid of three phases disbursed throughout the matrix. The resultant solidified structure is characterized by a particularly high tensile strength relative to the melting point.

Of course, it is to be understood that while the use of ternary Zn, Cu, Al alloys as filler metals may be useful, the cold metal transfer joining practices described herein are in no way dependent upon the use of such alloys. Accordingly, other alloys including other zinc alloys and standard filler metals may likewise be utilized if desired.

It is to be understood that while the present invention has been illustrated and described in relation to potentially preferred embodiments, constructions, and procedures, that such embodiments, constructions, and procedures are illustrative only and that the invention is in no event to be limited thereto. Rather, it is contemplated that modifications and variations embodying the principals of the invention will no doubt occur to those of skill in the art. It is therefore contemplated and intended that the present invention shall extend to all such modifications and variations as may incorporate the broad aspects of the invention within the true spirit and scope thereof.

The invention claimed is:

1. A method of joining or repair of a metal surface laminate construction, the laminate construction comprising a metal sheet with an outer metal surface layer and an opposing surface layer to which a polymer layer is bonded, the polymer layer being coextensive with the opposing surface layer, the metal sheet having a thickness up to about one-half millimeter and the polymer layer being no thicker than the metal sheet, the method comprising the steps of:
 (a) providing at least a first laminate construction comprising at least a first outer metal surface layer with at least one polymer layer disposed on an opposing sheet surface layer below the first metal outer surface layer;
 (b) defining a desired weld line along said the first outer metal surface layer in which weld filler metal is deposited in contact with polymer material of the polymer layer; and
 (c) applying a substantially continuous weld along the defined weld line, by use of cold metal transfer gas metal arc welding, wherein a weld wire of filler metal comprising a zinc based alloy is cyclically inserted and withdrawn from a weld pool during weld application in coordination with activation and deactivation of arc heating, such that arc heating is terminated when the weld wire contacts the weld pool and arc heating is reactivated when the weld wire is withdrawn from with the weld pool, such that heat input to the laminate construction is limited for the purpose of minimizing thermal damage to the polymer material in the vicinity of the weld.

2. The invention as recited in claim 1, wherein said first metal surface layer comprises a steel alloy.

3. The invention as recited in claim 1, wherein the zinc based alloy consists essentially of, by weight, about 4 to 12 percent copper, about 2 to 8 percent aluminum, optionally up to 0.05 percent magnesium and the balance zinc and impurities.

4. The invention as recited in claim 1, wherein the zinc based alloy consists essentially of, by weight, about 3.5 to 4.5 percent copper, about 6.3 to 8 percent aluminum, optionally up to 0.05 percent magnesium and the balance zinc and impurities.

5. The invention as recited in claim 1, wherein the zinc based alloy consists essentially of, by weight, about 10 to 11 percent copper, about 2 to 4 percent aluminum, optionally up to 0.05 percent magnesium and the balance zinc and impurities.

6. A method of joining a pair of metal surface laminate constructions, the method comprising the steps of:
  (a) providing at least a first laminate construction and a second laminate construction, each of the laminate constructions comprising a first metal surface layer and second metal surface layer with at least one polymer layer disposed at a position between the surface layers, each of the metal surface layers of the laminate constructions having a thickness of up to about one-half millimeter and each of the polymer layers having a thickness of no more than about sixty percent of the thickness of its laminate;
  (b) positioning the first laminate construction in adjacent or overlapping contacting relation with the second laminate construction to define an interface between the first and second laminate constructions for a weld line to be formed in which weld filler metal is deposited in contact with a portion of at least one of the first and second laminate constructions such that the weld filler material extends at least entirely across the thickness of one of the metal surface layers and the thickness of the polymer layer of the at least one of the first and second laminate constructions; and
  (c) applying a substantially continuous weld along the weld line at the interface between the first and second laminate constructions by use of cold metal transfer gas metal arc welding, wherein a weld wire of filler metal comprising a zinc based alloy is cyclically inserted and withdrawn from a weld pool during weld application in coordination with activation and deactivation of arc heating, such that arc heating is terminated when the weld wire contacts the weld pool and arc heating is reactivated when the weld wire is withdrawn from with the weld pool, such that heat input to the interface is limited for the purpose of minimizing thermal damage to the polymer material in the vicinity of the weld.

7. The invention as recited in claim 6, wherein said first and second metal surface layers each comprises a steel alloy.

8. The invention as recited in claim 6, wherein the zinc based alloy consists essentially of, by weight, about 4 to 12 percent copper, about 2 to 8 percent aluminum, optionally up to 0.05 percent magnesium and the balance zinc and impurities.

9. The invention as recited in claim 6, wherein the zinc based alloy consists essentially of by weight, about 3.5 to 4.5 percent copper, about 6.3 to 8 percent aluminum, optionally up to 0.05 percent magnesium and the balance zinc and impurities.

10. The invention as recited in claim 6, wherein the zinc based alloy consists essentially of, by weight, about 10 to 11 percent copper, about 2 to 4 percent aluminum, optionally up to 0.05 percent magnesium and the balance zinc and impurities.

11. The invention as recited in claim 6, wherein at least one of the first laminate construction and the second laminate construction further comprises at least one interior metal layer disposed between the first metal surface layer and second metal surface layer.

12. The invention as recited in claim 6, wherein each of the first laminate construction and the second laminate construction further comprises at least one interior metal layer disposed between the first metal surface layer and second metal surface layer.

13. A method of forming a welded joint between two metal surface elements where at least one of the metal surface elements comprises a metal sheet having a thickness up to about one-half millimeter and the metal sheet has a polymer layer bonded to at least one side of the sheet, the polymer layer being no thicker than the sheet and lying in the vicinity of the welded joint, the method comprising the steps of:
  (a) providing a first metal surface element and a second metal surface element;
  (b) positioning the metal surface elements in contacting relation for a weld line to be formed along a surface element in which weld filler metal is deposited in contact with polymer material of the polymer layer; and
  (c) applying a weld along the weld line between the metal surface elements by use of cold metal transfer gas metal arc welding, wherein a weld wire of filler metal consisting essentially of, by weight, about 4 to 12 percent copper, about 2 to 8 percent aluminum, optionally up to 0.05 percent magnesium and the balance zinc and impurities is cyclically inserted and withdrawn from a weld pool during weld application in coordination with activation and deactivation of arc heating, such that arc heating is terminated when the weld wire contacts the weld pool and arc heating is reactivated when the weld wire is withdrawn from with the weld pool, such that heat input to the interface is limited for the purpose of minimizing thermal damage to the polymer material in the vicinity of the weld.

14. The invention as recited in claim 13, wherein the filler metal consists essentially of, by weight, about 4 percent copper, about 7.6 percent aluminum, optionally up to 0.05 percent magnesium and the balance zinc and impurities.

15. The invention as recited in claim 13, wherein the metal surface elements are disposed in overlapping relation at the interface.

16. The invention as recited in claim 13, wherein the metal surface elements are disposed in abutting relation at the interface.

* * * * *